May 31, 1927.  1,630,247
H. H. ADLER
MEANS FOR DETERMINING COLOR COMBINATIONS
Filed Sept. 8, 1922
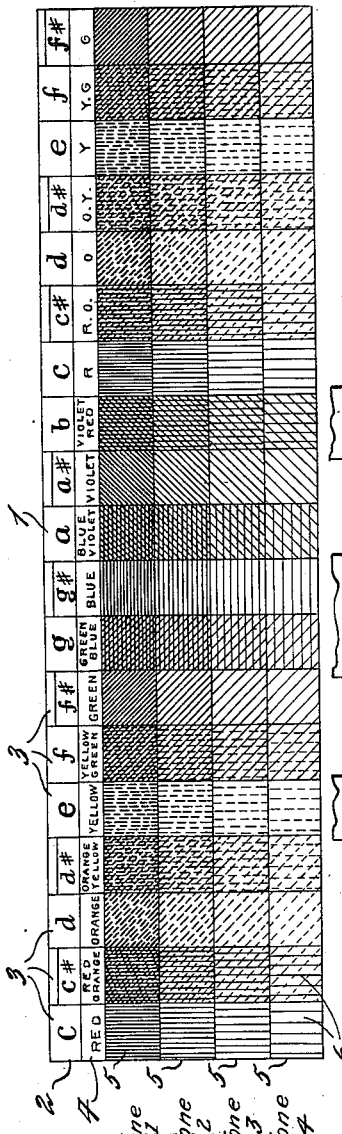
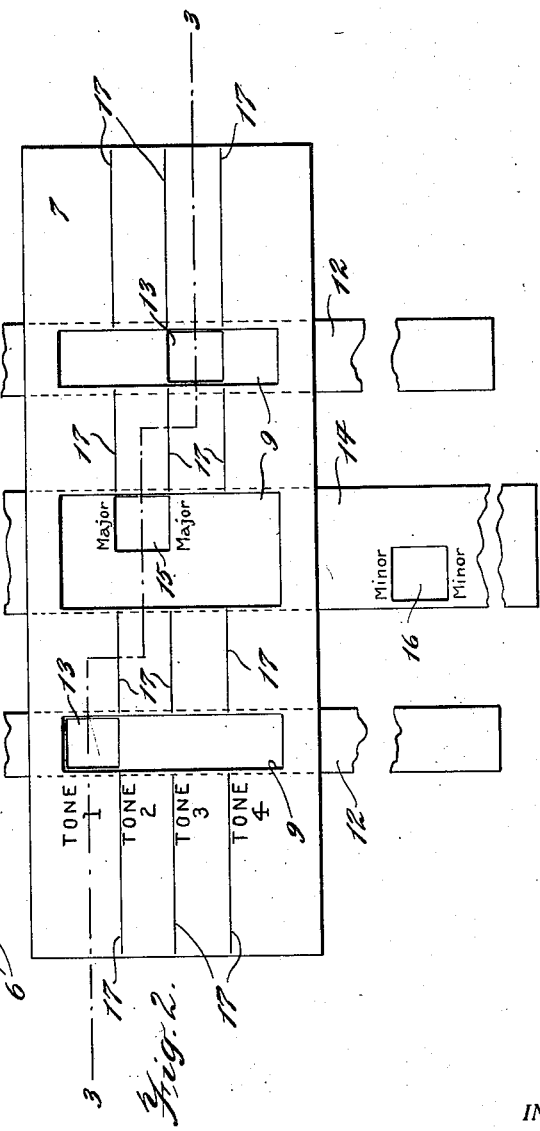
INVENTOR.
Hazel H. Adler
BY
Gifford, Bull & Scull
ATTORNEYS Patented May 31, 1927.

1,630,247

UNITED STATES PATENT OFFICE.

HAZEL H. ADLER, OF NEW YORK, N. Y.

MEANS FOR DETERMINING COLOR COMBINATIONS.

Application filed September 8, 1922. Serial No. 586,820.

My invention relates to new and useful improvements for ascertaining and determining harmonious combinations of colors, or shades, blends, or tints of colors, and more particularly contemplates a simple device for determining harmonious combinations in accordance with the principle set forth in Patent No. 1,308,512, dated July 1, 1919, granted to Henry Fitch Taylor, and as further developed and simplified by me as disclosed in my application for Letters Patent, filed June 30, 1921, Serial No. 481,607.

In my said application, I have shown and described a means for determining color combinations including a chart in which rows or series of areas each constituting a diatonic scale of color, are arranged in relation to indications of the chromatic scale in music, so that each such diatonic scale based upon a selected key-note color is shown in alinement with the colors of the scale for each key-note segregated from the complete spectrum, thus permitting each individual diatonic scale to be viewed and appreciated separately and the desired harmonious color combinations to be readily selected therefrom. In said application, it is contemplated that each of said rows may be the true colors of the spectrum, or may be any tints, neutralizations, or gradations thereof, so long as the sequence of colors in each row maintains the proper relation or relative value of the color sequence of the spectrum, and these colors are arranged according to a musical notation, and have also stated that the color areas of the spectrum bear the same relation to each other irrespective of the pitch of color which may constitute the colors of the spectrum, so that the colors may be true to those contained in the spectrum, or may be of a higher or lower pitch or tone, if the proper relations are maintained. It is one of the objects of the present invention to provide a simple device according to said principle, in which rows differing from each other in pitch, tone, tint, blend or gradation, are provided, and the present invention is illustrated as including a chart wherein each row includes representations of a complete chromatic scale of colors corresponding to the musical scale whereas in my application chromatic scale whereas in my application above referred to, as above stated, each row represents the selected notes of the particular diatonic scale corresponding to the key-note. In my present invention as herein illustrated each row does not differ from the other in scale but only in tone. In my present invention I also provide means whereby harmonious color combinations may be mechanically selected from areas in different rows, that is, whereby one or more such colors in one row may be combined harmoniously with one or more such colors in another row or other rows.

The invention consists in the improvements to be more fully described hereinafter, and the novelty of which will be particularly pointed out and distinctly claimed.

I have fully and clearly illustrated one embodiment of my invention in the accompanying drawings to be taken as a part of this specification, and wherein—

Figure 1 is a plan view of a chart constructed and arranged according to my invention;

Fig. 2 is a plan view of a selecting device for selecting harmonious color combinations from the chart shown in Fig. 1;

Fig. 3 is a longitudinal sectional view on the line 3—3 of Fig. 2.

Referring to the drawings by characters of reference, 1 designates a plate, board or sheet forming the body or ground of the chart, and which may be of cardboard, paper, or any other material suitable for the purpose. On this chart is arranged a horizontally extending row or series 2 of indications, preferably in the form of areas 3, preferably rectangular in form, and of equal width, which areas are arranged to correspond in sequence to the notes of the chromatic musical scale, and contain the musical designations of such scale from "C" to "B", with the intermediate half-tones C#, etc., according to the usual designations employed to designate the notes and half-notes of a chromatic scale. The areas 3 constitute twelve divisions equally spaced and proportioned to the twelve half-spaces or tones of the chromatic musical scale. In the embodiment illustrated, I have shown a complete scale beginning with the C note and extending in sequence through the B note at the end of the scale, and followed by a portion of a chromatic scale beginning with the C note and extending in sequence in equally spaced areas to and through the F# note, for a purpose to be presently described.

Beneath the indications or areas 3 is arranged a horizontally disposed series of indications, preferably in the form of areas 4 corresponding to, and in vertical alinement, respectively, with, the areas 3, heretofore described, so that one of the areas or spaces 4 is located beneath each of the areas 3. These areas 4 are arranged to correspond to the colors of a spectrum, and may be colored by paint, printing, or otherwise, to depict such colors, or, as shown in the drawings, may contain letters or other indications designating colors in the relation they bear to each other in the spectrum. In the present embodiment, the colors and the relations to each other corresponding to the chromatic scale notes from C to B are in sequence indicated by the names of the colors beginning with red, followed by red-orange, orange, orange-yellow, yellow, yellow-green, green, green-blue, blue, blue-violet, violet, violet-red, red, etc., said names being each arranged respectively under the notes of the scale, as indicated in Fig. 1. The areas following the first violet-red are similarly indicated and arranged relative to the notes following the first scale mentioned.

The series of areas 4 constitutes a scale of color in harmonic arrangement corresponding to the chromatic scale in music. The arrangement of the areas 3 and 4 indicates the manner in which the chromatic musical scale is to be applied to colors of a spectrum to ascertain or determine the divisions of the areas of color in the spectrum selected corresponding to the chromatic scale, but it will be understood that this arrangement, as so far described, does not in itself show any selection, segregation, or combination of colors as regards a harmonious effect produced.

With the chromatic scale of color determined and indicated in the manner just described, I am able to apply the principle for making musical harmonies to the making of color harmonies from a plurality of rows of areas of colors, tints, shades, blends, etc., in which the areas in each row are arranged according to the relation borne to each other by the primary colors in the spectrum and corresponding to the musical notation of the chromatic scale, but in which the rows differ from each other in pitch, that is, may be higher or lower than the true colors of the spectrum, or may differ as to tint, gradation, blend, or neutralization.

Beneath the areas 4 and in horizontal arrangement are arranged a plurality of rows 5 of indications 6, preferably in the form of areas, each row preferably consisting of areas of any suitable form, arranged in horizontal sequence in correspondence with the chromatic scale indicated by the areas 4, which, as described, indicate colors of the spectrum. In the present embodiment, I have shown four such rows 5, but there may be less or more than four, as may be desired.

In the embodiment shown, the row 5 next to the areas 4 may consist of areas 6, which are the true colors of the spectrum corresponding to the colors indicated by the indications in the areas 4. The following rows in sequence may represent lighter or lower tones or pitch of color, but all are based on the colors of the spectrum according to the proper sequence—that is, the first row 5 may contain areas corresponding to true colors of the spectrum, the second or next row be colored to represent a lighter tone of the same colors, the third row a still lighter tone, and so on through as many rows as it may be desired to employ. It will be seen that the colors in each vertical row become progressively lighter or gradated in tone from top to bottom of the column.

As is clearly seen from the drawings, the color areas of all of the rows, no matter of which tone, are arranged according to the chromatic scale, and according to the principle heretofore mentioned colors corresponding to musical notes which would be in harmony, will also be in harmony, no matter whether selected from one of the rows 5, or from different rows. For example, in each of the rows 5, the color areas 6 corresponding to C, D, E, F, G, A, B, C, etc., will be in harmony; also the colors corresponding to C#, D#, F, F#, G#, A#, C, C#, etc. will be in harmony; the colors corresponding to D, E, F#, G, A, B, C#, D, etc. will be in harmony; the colors corresponding to D#, F, G, G#, A#, C, D, D#, etc. will be in harmony, and so on throughout the chart, according to the law of musical harmony on the chromatic scale, i. e., those corresponding to the diatonic scale. It will be seen that by selecting any color area as the key-note color, for example, red-orange, corresponding to C#, as given in the second example above, and following the law of musical harmony, those colors which are in harmony with red-orange may be ascertained.

I provide mechanical means whereby triads, or major and minor chords of musical harmony may be used as the basis for selecting from each row, or from different rows 5, any number of combinations which will be in color harmony. This means may take a number of forms, but preferably consists of an indicator in the form of a mask having openings through which the selected areas in the rows may be viewed simultaneously. This mask consists of a card, board, or sheet 7, having upper and lower plates 8, 8, formed with alining openings 9, extending parallel to each other, and preferably of a length sufficient to bridge or expose all of the color areas which are in alinement in one of the rows extending from top to bottom of the chart, for example, all the color areas which are located under the note C. The plates 9 are spaced or separated by filling-pieces 10, to which said plates are suitably secured, and the edges of which filling-pieces lie parallel to but fall short of the edges of the openings 9, to thereby provide guideways or slots 11 extending transversely of the mask. There are three of the transverse openings 9, the end ones being of a width to expose but one column of color areas at a time, but the intermediate opening is made wide enough to expose two adjacent columns of color areas, for a purpose to be presently described.

Closing each of the end openings 9 is a slide member 12, guided by the guideways 11, said member having an opening 13, which, by sliding the slide member in the direction of its length, may be located to expose any one of the color areas in one of the vertical rows of areas 6. The intermediate opening 9 is closed by a slide member 14, having two openings 15, 16, the former of which is adapted to be adjusted to take position over any one of the areas 6 to complete a major triad, while the latter opening may be adjusted to take position to expose any one of the areas 6 to complete a minor triad.

The mask is preferably provided with horizontally spaced lines 17, so as to facilitate proper location of the mask on the chart when selecting colors therefrom, said mask being so placed that said lines register with the lines between the horizontal rows 5, as indicated in Fig. 2 of the drawings.

By the use of this preferred form of indicating or selecting means, the major and minor chords of harmonious color may be selected. For instance, colors appearing through the openings 13, 13 and the opening 15, will be a major chord of colors in harmony, and the colors appearing through the openings 13, 13 and the opening 16, will be a minor chord of colors in harmony.

In order to mechanically select a diatonic chord on the chart, the mask is arranged with the opening 9, at the left, to appear over the vertical row of color areas containing the selected key-note color, for example, the row under note C containing different tones of red, and the slide 12, is adjusted to expose the desired key-note color. It will then be found that any color exposed through the opening 15 by adjustment of the slide 14, and any color exposed through the extreme right opening 13, by adjustment of the extreme right slide 12, will be in harmonious color relation to the key-note color. In such example, with the key-note color selected as red under note C, the three colors exposed by the mask may be any colors exposed in the row under note C (red) in the row under note E (yellow), and in the row under note G (green-blue), and these colors will be in harmonious color relation as are the notes C, E and G in harmonious musical relation. Again if, for example, red-orange, or a tone of red-orange is selected as the key-note color, the mask is placed with the first opening over the column indicated as red-orange, which falls under note C#, and the left slide 12 is adjusted to expose the desired tone of red-orange through its opening 13. Thereupon, it will be found that the second opening 15 will be located over the column yellow-green corresponding to note F, and the slide 14 may be adjusted to expose any tone area in this column. It will also be found that the opening 13 in the extreme right hand slide 12 will be located over the column blue corresponding to the note G# and this slide may be adjusted to expose any tone area in this column, and the three colors thus exhibited will be found to be in harmony, as are the corresponding notes in harmony. The same result will be obtained when employing any one of the colors on the chart as a key-note color.

When it is desired to find the second chord of a color scale of any of the rows 4, the mask is adjusted in the same manner as above described, except that the opening 16 (marked minor) in the intermediate slide is used instead of the opening 15 (marked major) to expose the colors and the colors exhibited will correspond to the minor chord. For example, if the first opening at the left of the mask is placed in the space indicated orange under note D, it will be found that any tone in the column thereunder, any tone in the column under yellow-green (note F), and any tone in column under blue-violet (note A), will be in harmonious color relation, as are the musical notes D, F and A, corresponding to these colors, in musical harmony. The third chord of the musical scale is also a minor chord, and in order to obtain the harmonious color combination corresponding to the third or minor, it is only necessary to place the left-hand opening of the mask over the third note of any diatonic scale in one of the rows 5, whereupon the tones in harmony therewith will appear in the areas exposed by adjustment of the slide 14 or the other slide 12. For example, if yellow is selected as the key-note color, the mask will be placed with the first opening over the yellow column, and the three openings 13, 16 and 13 adjusted to exhibit any tone area in the yellow column, the green-blue column and the violet-red column, which will be found to be in harmonious relation.

The fourth and fifth chords, according to the musical scale, are major chords and may be found by placing the mask with the first opening 13 at the left over the fourth or fifth note of any scale, according to which it is desired to employ as the key-note color, and employing the opening 15 of the slide 14. The sixth chord is minor and will be found by applying the first opening of the mask to the sixth note of any scale and employing the opening 16 of the slide 14.

The seventh chord, which corresponds to the diminished seventh in music, is not a definite triad, and, therefore, cannot be ascertained by the use of the mask. It is to be noted, however, that since the chart contains all the half tones of the chromatic scale and includes not only one complete scale but also a repetition in the same order of the first seven half tones of another identical scale, it is possible with a mask to mechanically select all of the diatonic chords of the different scales. For example, the seventh full note of the chart which is B (violet-red) is the sixth full note of the scale D (orange). If the first or left hand opening 13 of the mask is adjusted to exhibit a tone area in the column violet-red, and the slide 14 is arranged for the use of its "minor" opening 16, that opening may be adjusted to exhibit any tone area in the column orange, and the extreme right opening 13 may be adjusted to exhibit any tone area in the column green, and the three color areas thus exhibited will be in harmony, as are the corresponding notes of the sixth cord (minor) in the scale of D. So also this seventh full note B (violet-red) is the fifth full note of the scale of E (yellow), and therefore with the "major" opening 15, the colors violet-red, orange-yellow and green, in any tone desired, may be exhibited, and will be in harmony as are the corresponding notes of the fifth chord (major) in the scale of E.

Although the above description as to selection of chords has been made in the nomenclature of music, the selection by the use of the means above described is purely mechanical, and can be made by one ignorant of music, it being only necessary to adjust the mask so that the first opening 9 is at any tone area of any color of the first chromatic scale, C to B, inclusive, and the colors exhibited at any position of the two other slides will be in harmony therewith, the "major" opening giving one selection of harmonious colors and the "minor" opening a different selection of harmonious colors, differing only in the intermediate color. Obviously therefore the user may not only be ignorant of music but also ignorant of the theory of color or color harmonies, and yet will inevitably select by the mechanical operation of the device, harmonious combinations of color, selected and harmoniously combined even though the tones differ in degree or pitch.

It will thus be seen that I have provided a device whereby colors or tones of colors may be selected and harmoniously combined even though the tones differ in degree or pitch.

Thus the color selected by the mask need not lie in any one row or any one column, but may be staggered, both as to rows and as to columns.

What I claim and desire to secure by Letters Patent of the United States is:—

1. A device including a color chart showing colors of the solar spectrum harmonically arranged in series to cover an entire range of the spectrum followed by a considerable part of a second identical range in the same order so that the whole series is harmonically arranged, a second differently toned series of identically arranged colors fixed relatively to the first series, said second series also including one range of the spectrum colors followed by a considerable part of a second identical range in the same order, and a mask adjustable to any color of either series and exhibiting only those colors of the two series which harmonize with the color to which the mask is adjusted.

2. A device including a color chart showing colors of the solar spectrum harmonically arranged in series to cover an entire range of the spectrum followed by a considerable part of an identical range in the same order so that the whole series is harmonically arranged, other series of harmonically arranged colors in correspondence therewith each also including one range of the spectrum colors followed by a considerable part of a second identical range in the same order, the colors of each series differing in tone from the corresponding colors of all the other series, and a mask adjustable to any color of any series and exhibiting only those colors of some of the various series which harmonize with the color to which the mask is adjusted.

3. A device of the character described comprising a plurality of rows of color indicating areas corresponding to the color sequence of a spectrum, each row including one entire range of the spectrum colors followed by a considerable part of a second identical range in the same order the colors in each row being arranged in sequence according to the notes of a musical scale and the color area for each color in each row differing in tone or pitch from the corresponding color area in the other rows, said rows being so arranged that the different pitches or tones for each color are disposed in alinement in gradated relation, and means settable at any selected color in any row for thereby selecting from any of said rows three-color harmonious color combinations of which the selected color forms an element corresponding to harmonious musical combinations.

4. A device of the character described comprising a plurality of rows of color indicating areas corresponding to the color sequence of a spectrum, each row including one entire range of the spectrum colors followed by a considerable part of a second identical range in the same order, the colors in each row being arranged in sequence according to the notes of a musical scale, the color area for each color in each row differing in tone or pitch from the corresponding color area in the other rows, said rows being so arranged that the different pitches or tones for each color are disposed in alinement in gradated relation, and means settable at any selected color in any row for thereby selecting from any of said rows three-color harmonious color combinations of which the selected color forms an element, said means including an element variably settable at positions corresponding to a minor or major harmonious musical chord.

5. A device of the character described comprising a plurality of rows of color indicating areas corresponding to the color sequence of a spectrum, each row including one entire range of the spectrum colors followed by a considerable part of a second identical range in the same order the colors in each row being arranged in sequence according to the notes of a musical scale, the color area for each color in each row differing in tone or pitch from the corresponding color area in the other rows, said rows being so arranged that the different pitches or tones for each color are disposed in alinement in gradated relation, and means settable at any selected color in any row for thereby selecting from any of said rows harmonious color combinations corresponding to a harmonious musical chord of which the selected color forms an element, said means comprising a mask having openings spaced to expose the harmonious color combinations.

6. A color chart showing the principal colors of the solar spectrum harmonically arranged in series, said series including one entire range of the spectrum colors followed by a considerable part of an identical range in the same order so that the whole series is harmonically arranged, other series of harmonically arranged colors in correspondence therewith each also including one range of the spectrum colors followed by a considerable part of a second identical range in the same order, said other series differing in tone and with the color thereof alined with the colors of the first mentioned series so that colors of different tones correspond, and a mask adjustable to any color of any series and exhibiting any one of a plurality of colors harmonizing with the color to which it is adjusted.

7. A color chart showing the principal colors of the solar spectrum harmonically arranged in series, said series including one entire range of the spectrum colors followed by a considerable part of an identical range in the same order so that the whole series is harmonically arranged, other series of harmonically arranged colors in correspondence therewith each also including one range of the spectrum colors followed by a considerable part of a second identical range in the same order, said other series differing in tone and with the color thereof aligned with the colors of the first mentioned series so that colors correspond in the successive series to successively increased differences of tone, and a mask adjustable to any color of any series and exhibiting any one of a plurality of colors harmonizing with the color to which it is adjusted.

8. A device including a color shart showing colors arranged in rows, the colors of each row varying in tone from the colors of the adjacent row, a mask having an opening to exhibit one of the colors, and a slide in the mask shiftable to exhibit through an opening any of two colors harmonizing with the first color.

9. A device including a color chart showing colors arranged in rows, the colors of each row varying in tone from the colors of the adjacent row, a mask having an opening to exhibit one of the colors, and a slide in the mask shiftable to exhibit through one opening a harmonizing color in either of two tones and through another opening another harmonizing color in either of two tones.

10. A device including a color chart showing colors arranged in rows, the colors of each row varying in tone from the colors of the adjacent row, a mask having an opening to exhibit one of the colors, a slide in the mask shiftable to exhibit through an opening a color harmonizing therewith in either of two tones, and a second slide in the mask shiftable to exhibit through an opening therein a second color harmonizing with the other colors in either of two tones.

11. A device including a color chart showing colors arranged in rows, the colors of each row varying in tone from the colors of the adjacent row, a mask having an opening to exhibit one of the colors, a slide in the mask shiftable to exhibit through an opening a color harmonizing therewith in either of two tones or through another opening another color harmonizing therewith in either of two tones, and a second slide in the mask shiftable to exhibit through an opening therein a second color harmonizing with the other colors in either of two tones.

12. A device including a color chart having a plurality of aligned rows of color areas, a mask shiftable along the rows to cooperate therewith to show harmonizing colors through mask openings, and a slide shiftable in the mask to enable one opening to show a color in one row and another opening to show a color in another row.

13. A device including a color chart having a plurality of aligned rows of color areas, a mask shiftable along the rows to cooperate therewith to show harmonizing colors through mask openings, and two slides independently shiftable in the mask to show other colors in either of the other rows.

14. A device including a color chart having colors arranged in spectral order in each of two aligned rows, and a shiftable mask having openings adapted to display harmonizing colors in the rows in staggered arrangement while concealing the colors adjacent thereto.

15. A device including a color chart having a series of colors arranged in spectral order followed by a considerable part of the identical colors identically arranged, a second series of colors also arranged in spectral order followed by a considerable part of the identical colors identically arranged, said second series differing from the first series but aligned therewith, and a mask having openings adapted to display harmonizing colors in the rows in staggered arrangement while concealing the colors adjacent thereto.

16. A device of the character described comprising a plurality of rows of color indicating areas corresponding to the color sequence of a spectrum, the colors in each row being arranged in sequence according to the notes of a musical scale, the color area for each color in each row differing in tone or pitch from the corresponding color area in the other rows, said rows being so arranged that the different pitches or tones for each color are disposed in alinement in gradated relation, means for selecting from any of said rows harmonious color combinations corresponding to a harmonious musical chord, said means comprising a mask having openings adapted to expose the harmonious color combinations in said rows, and slide members for selecting individual colors from each of said rows.

17. A device of the character described comprising a plurality of rows of color indicating areas corresponding to the color sequence of a spectrum, the colors in each row being arranged in sequence according to the notes of a musical scale, the color area for each color in each row differing in tone or pitch from the corresponding color area in the other rows, said rows being so arranged that the different pitches or tones for each color are disposed in alinement in gradated relation, means for selecting from any of said rows harmonious color combinations corresponding to a harmonious musical chord, said means comprising a mask having openings adapted to expose the harmonious color combinations in said rows, and slide members for selecting individual colors from each of said rows, the intermediate slide members having openings adapted to select a color completing a major or minor chord.

In testimony whereof I have hereunto signed my name.

HAZEL H. ADLER.